Dec. 12, 1933.  W. M. BAILEY  1,938,792

CONDENSER WITH GROUP CLAMPS

Filed Jan. 16, 1929

Inventor:
William M. Bailey
By his Attorney
Philip Farnsworth

Patented Dec. 12, 1933

1,938,792

UNITED STATES PATENT OFFICE 1,938,792

CONDENSER WITH GROUP CLAMPS

William M. Bailey, Lynn, Mass., assignor, by mesne assignments, to General Electric Company, a corporation of New York Application January 16, 1929. Serial No. 332,921

15 Claims. (Cl. 175—41)

This invention relates to capacitors and has for its object to provide a plurality of capacitor sections, each of which is of the precise value desired and compactly mounted in a simple manner.

When a large number of capacitor sections are grouped or stacked together in a clamp, as has long been the common practice, it is practically impossible to have each section of the precise value required. A typical section is composed of clamped layers of dielectric and armature sheets such for example as mica and metal foil, and its capacity changes to some extent with pressure variations. It is customary, in manufacturing, to bring the capacity of each section to the desired value by cutting off or adding foil and then testing it by applying the desired clamping pressure to such section before assembly with others in a stack to be compressed as a whole from end to end. When a number of sections in a stack are clamped contiguous each other by the same pressure at which each was by test found correct, the value of each section will not necessarily be what was expected, and the total error in capacity, due to having a number of sections together in a stack under the same clamping pressure, may be as large as 10%. The reason for this error I conceived to reside in the slight differences in thickness of individual sections at different portions due to the above cutting away or addition of foil, and in the possibility of such slight differences becoming cumulative when a number of sections in the stack are clamped together, so that the total error might be due to an unequal pressure distribution across the surface of the layers of foil and mica in the entire clamped stack-assembly, or at least different distribution of pressure across the face of said layers in the stack as compared to the distribution of pressure when a single section is clamped by itself.

Another objection to the arrangement of a large number of capacitor sections clamped in a single stack or group under compression, especially when the usual practice is followed of having the capacitor stack embedded in a plastic dielectric, like paraffin wax, is that in the event of breakdown of one section it is necessary to remove the wax and clamping pressure from the entire stack and remove from the casing many more sections than the one requiring repair. This entails a large amount of labor and expense, to say nothing of the difficulty of attaining the former values for the capacitor sections after removal and re-stacking and re-clamping, as before removal.

According to this invention, these foregoing disadvantages have been eliminated by providing capacitor sections arranged in small groups, each group separately clamped and the groups compactly mounted on a common support. In this way any error due to the aforementioned causes is prevented from becoming large, and in addition, in the event of breakdown of one section, wax and pressure need be removed from only that stack or group containing a section in need of repair and the other stacks or groups need not be disturbed. This arrangement is superior to a construction in which each section is separately clamped for in that case, the provision of clamping means for each separate section would entail a structure unnecessarily bulky and expensive to assemble. The embodiment of the invention subsequently described, comprises the grouping of sections of different values under separate clamps. The terminal leads of the sections as well as the separate group-clamping means and supports are shielded by a metal casing, and at least one side of each capacitor section is connected to a terminal on the cover, the terminals being so arranged that any one of the sections may be separately selected or any two or more or all of the sections connected in parallel.

Referring to the drawing:

Fig. 2 shows two stacks of which one includes sections S1, S2, S3 and that other includes sections S4, S5, both enclosed in casing 1.

Figure 1:
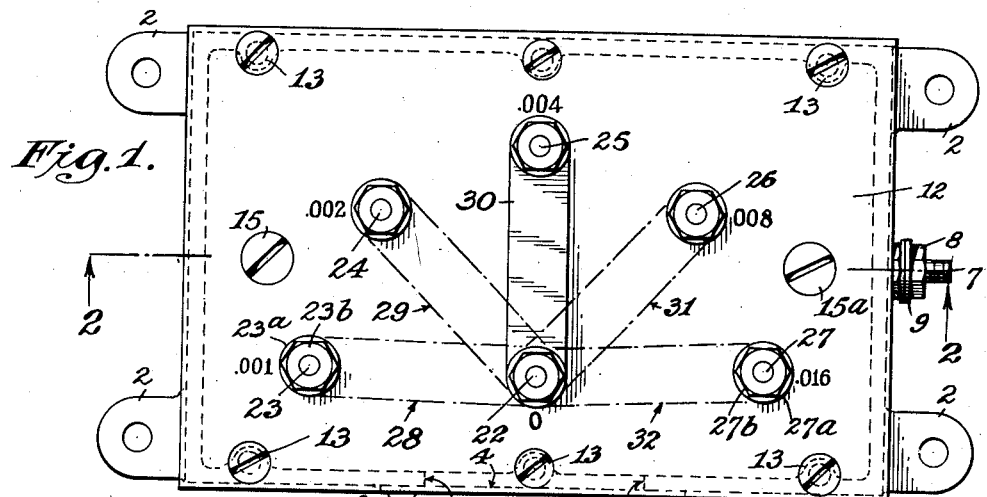
Fig. 1 is a top plan view of one embodiment of this invention.

The casing 1 of aluminum or other metal is provided with the usual mounting feet 2, and an opening 3 on one wall of the casing constituting a filling port permitting the assembled condenser stacks of sections to be inclosed with a plastic insulating material W like paraffin wax having a melting point of about 73° C. after the entire unit has been completely assembled in the otherwise closed casing. The filling port 3 is closed by a cover 4 held in position by screws 5.

Figure 2:
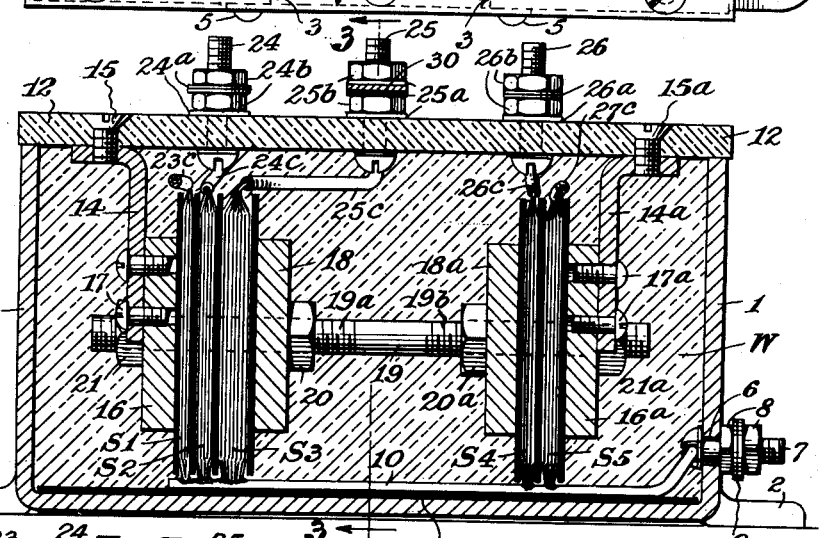
Fig. 2 is a longitudinal section on the line 2—2 in Fig. 1.
Figure 3:
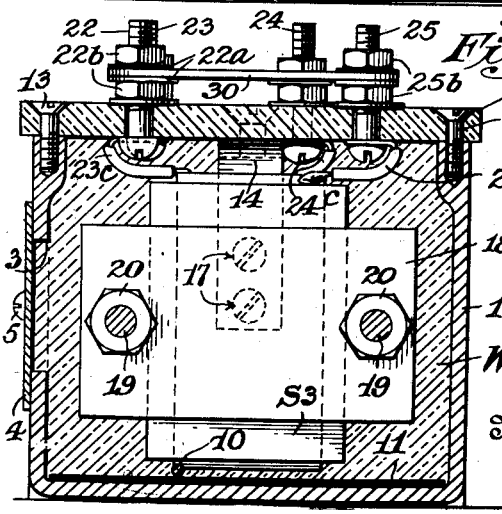
Fig. 3 is a vertical transverse section on the line 3—3 of Fig. 2.

Through one wall of the casing 1, preferably remote from the insulating cover 12 is a hole 6 through which extends the binding post 7 grounded to the casing and provided with the customary nuts 8 and washers 9. A conductor 10 connects the binding post 7 with one side of each of a number of capacitor sections S1, S2, S3, S4 and S5. A layer of micanite or other insulating material 11, between lead 10 and casing 1, reduces any losses due to proximity of the grounded case to lead 10. The cover 12 is a phenolic condensation product or other appropriate insulating material, and is secured to the casing by the screws 13. Brass straps 14 and 14a are secured to the cover 12 by the screws 15 and 15a and support the two stacks from the cover. Screws 17 and 17a connect the straps 14 and 14a with steel clamping plates or abutments 16 and 16a, as shown not threaded in Fig. 2, but strung on rods such as threaded bolts 19. Similar clamping plates 18 and 18a engage the opposite sides of each group of sections, the last named plates having no tapped holes for screws 17. These clamping plates extend laterally in both directions beyond the edges of their respective stacks, Fig. 3. Extending through both said laterally extending portions of plates 16, 16a, 18, 18a are two or more clamp bolts 19 threaded at 19a and 19b and provided with pairs of nuts 20, 21 and 20a, 21a, for clamping the respective groups of sections between the respective pairs of said clamping plates as shown in Figs. 2 and 3. Each stack and its sections can be treated independently of the other stack and its sections, by means of the two nuts for each stack. The sections are insulated from one another and the stacks from the clamping plates by the insulating sheets illustrated.

Located on the cover 12 but not connected below the cover with any of the sections is the input binding post 22 provided with the customary washers 22a and nuts 22b. Placed equidistant from the binding post 22 are a number of other binding posts 23, 24, 25, 26 and 27, each provided with the customary washers and nuts, and each connected to one of the sections. The lead 23c connects the section S1 with the binding post 23, lead 24c connects section S2 to post 24, lead 25c connects section S3 to post 25, lead 26c connects section S4 to post 26 and lead 27c connects section S5 to post 27. There are also provided a corresponding number of like busbars 28—32 which may be placed by the user on top of cover 12 for connecting the input terminal 22 outside the casing with any one of the terminals 23—27, there being only one such busbar illustrated in Fig. 1, and the others being indicated by dotted lines showing their position when used.

Figure 4:
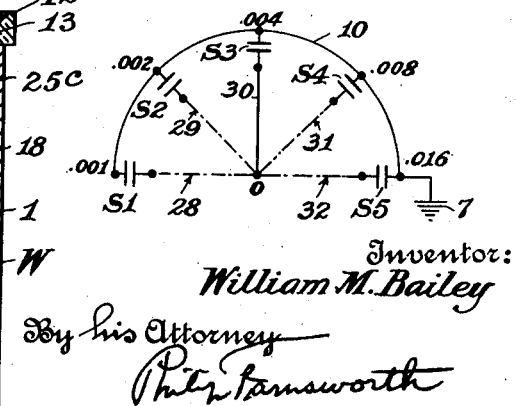
Fig. 4 is a wiring diagram illustrating the connections of the capacitor sections.

From Fig. 4 it will be seen that by joining any one of the binding posts 23—27 to the input post 22 by using one of the busbars, as 30, Fig. 1, that the unit may be given any one of a number of capacities. In the specific example illustrated the section S1 has a capacity of .001 microfarads and the other sections have the capacities indicated. With the one busbar 30 used connecting the stack S3 the unit (between common input post 22 and common grounding post 7) has a capacity of .004 microfarads. By using all the busbars the unit may have a capacity of .031 microfarads. By using other busbar arrangements, other capacities of the unit may be provided. It will thus be seen that a wide selection of capacities between maximum and minimum are possible.

Having the grounded terminal 7 remote from the cover terminals reduces the capacity between terminals to a minimum. Having the terminals 23 to 27 arranged in the arc of a circle about the input binding post 22 permits the busbars to be alike. In the embodiment illustrated in Fig. 2 the sections S4, S5 of larger capacity are grouped in a stack apart from those of lower capacity, so that one group or stack may have a different pressure applied to it than the other group or stack although good results are obtainable by grouping a section of low capacity in a stack with one of high since the sections of high capacity are easier to get precise as to capacity and less likely to get out of adjustment. With the sections made of mica and foil layers the pressure applied to each group or stack is preferably between 200 and 500 lbs. per square inch since within these limits pressure changes due to temperature variations or other cause produce little capacity change.

I claim:
1. A capacitor including a casing inclosing a number of different sections each of different capacity from the others and arranged in groups, means adapted to apply different pressure to one group than to another and a support common to said groups, said pressure-applying means including separate abutments for each group and the abutments for one group being independent of the abutments for another group.

2. A capacitor including spaced groups of condenser sections, separate means for clamping each group and means common to said groups for supporting the same in alignment, a metal casing, and a cover of insulating material for said casing and from which said supporting means depends.

3. The combination with a plurality of capacitor sections, of a container for shielding said sections, a support within said container carrying more than one section, and separate clamping means on said support for said sections.

4. The combination with a plurality of mica and foil capacitor sections some of high and some of low capacity, of means for clamping the sections, the sections of high capacity being contiguous a section of lower value, means for separately clamping other sections contiguous each other, supporting means common to both clamping means and a container for said sections, clamping, and supporting means, said pressure-applying means including separate abutments for each group and the abutments for one group being independent of the abutments for another group.

5. A capacitor including spaced groups of capacitor sections, separate means for clamping each group and means common to said groups for supporting the same, a metal casing, a cover of insulating material for said casing and from which said supporting means depends, a terminal on said metal casing; means connecting said terminal with one side of each section, a separate terminal on said cover for the opposite side of each of said sections, an additional terminal on said cover and similar means for connecting said additional terminal with any one or more or all the other cover terminals according to the capacity desired.

6. A capacitor including a casing inclosing a number of different sections each of different capacity from any other and arranged in groups, and means adapted to apply different pressure to one group than to another and a support common to said groups, said pressure applying means being insulated from both sides of each section and group.

7. A capacitor including a plurality of sections of armature and dielectric sheets, said sections being grouped in a plurality of stacks; a metallic casing having an insulating cover; stack-supporting means secured to said cover and extending into the casing; pressure-plates supported by said supporting means; threaded means supported by said pressure-plates; additional pressure-plates supported by said threaded means in positions cooperating with the first pressure-plates in independently clamping the respective stacks; and nuts on said threaded means effecting said stack-clamping.

8. A capacitor including a metallic casing having an insulating cover, supports secured to said cover and extending into the casing; pressure-plates secured to said supports and supported thereby; supporting means in turn supported by said pressure plates; a plurality of sections of armature and dielectric sheets grouped in a plurality of stacks; and clamping plates strung on said supporting means between said supports and supported by said supporting means and respectively clamping said stacks by said pressure-plates and supporting the stacks independently in independently clamped condition.

9. A capacitor including a plurality of sections of armature and dielectric sheets, said sections being grouped in a plurality of stacks, in combination with means supporting said stacks in independently clamped condition, said stack-supporting and clamping means including, for each stack, two clamping members for the opposite faces of the stack at least one of which members for each stack is a clamping plate movable to and from one face of its stack; means holding the other members of said clamping member pairs in alinement with one another and means in supporting relation with the clamping members for the several stacks and supporting the movable clamping plates in alinement with their cooperating stack-clamping members.

10. A capacitor including a plurality of sections of armature and dielectric sheets, said sections being grouped in a plurality of stacks; a pair of clamping plates for each stack and extending beyond opposite edges of the respective stacks; threaded supporting means in supporting relations with said extending portions of the clamping plates and holding the clamping plates in alinement with one another; and nuts on said supporting means and compressing the respective stacks between their respective pairs of clamping plates.

11. A capacitor including a plurality of sections of armature and dielectric sheets, said sections being grouped in a plurality of stacks; a pair of clamping plates for each stack, threaded supporting means in supporting relation with said plates, said pairs of plates being spaced apart along said supporting means; and pairs of nuts on said supporting means for the respective pairs of plates, two nuts of two successive pairs being located in the space between successive pairs of plates.

12. A capacitor including a plurality of sections of armature and dielectric sheets, said sections being grouped in a plurality of stacks; a casing having metallic and insulating portions; a plurality of stack-clamping means inside the casing and independently clamping the several stacks; a plurality of binding posts mounted on the casing-cover, one of said posts being disconnected from said stacks; means connecting others of said posts to one set of terminals of the sections of said stacks; means outside the casing and connecting said disconnected post to a connected post; and a binding post connected to another set of terminals of the sections of the stacks and secured to the metallic portion of the casing.

13. A capacitor including a plurality of sections of armature and dielectric sheets, said sections being grouped in a plurality of stacks; a plurality of clamping means respectively clamping said stacks independently; a plurality of binding posts respectively connected to one set of terminals of the individual sections of the plurality of stacks; a binding post disconnected from said sections; means connecting said disconnected post to said connected posts; and a binding post connected to another set of terminals of said individual sections of the plurality of stacks.

14. A capacitor including a plurality of sections of armature and dielectric sheets, said sections being grouped in a plurality of stacks; a plurality of clamping means respectively clamping said stacks independently; a plurality of binding posts respectively connected to one set of terminals of the individual sections of the plurality of stacks; a binding post connected in common to another set of terminals of said sections; and means connecting a desired number of said sections in parallel to said common binding post.

15. A capacitor including a plurality of sections of armature and dielectric sheets, a metallic casing in which said sections are inclosed, said casing having an insulating cover; a grounding master lead inside the casing and connected to one set of terminals of said sections; a master binding-post supported by and grounded to the metallic portion of the casing and connected to said interior lead; a plurality of conducting posts supported by said insulating cover, projecting outside and inside the casing and permanently connected respectively inside the casing to another set of terminals of said sections therein; a master binding post also supported by said cover and projecting outside the casing and disconnected from said sections; and conducting means consisting of a plurality of connectors severally attachable to and between said disconnected master binding post and said plurality of connected posts respectively and detachable from all said posts, all whereby any desired number of said sections can be connected in parallel between the grounded master post and the disconnected master post.

WILLIAM M. BAILEY.